E. R. PHILLIPS.
FURROW OPENER FOR FERTILIZER DISTRIBUTORS.
APPLICATION FILED AUG. 16, 1919. RENEWED MAR. 1, 1922.
1,413,353. Patented Apr. 18, 1922.
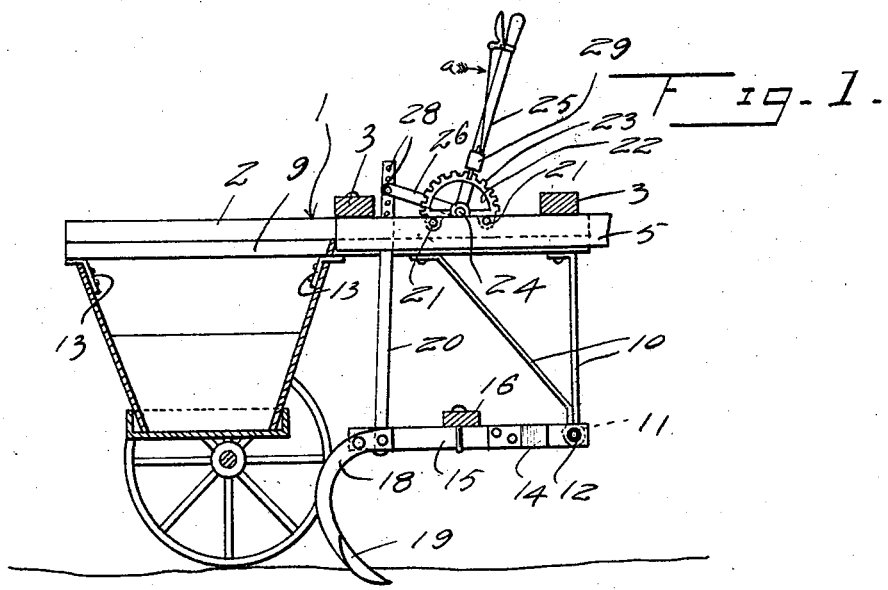
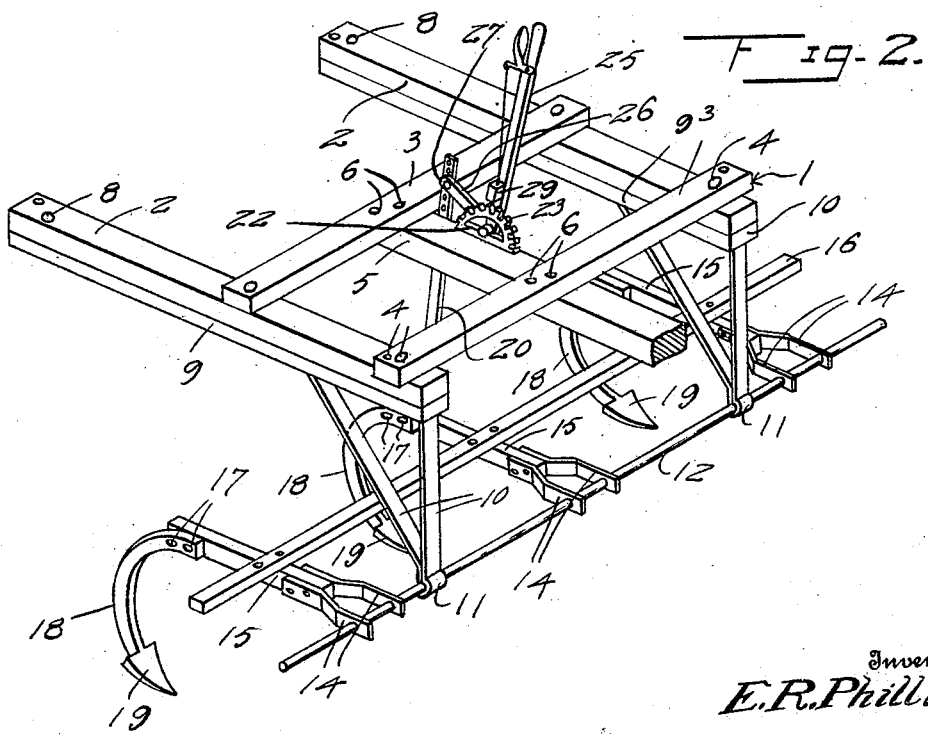
Inventor
E. R. Phillips
By Watson E. Coleman
Attorney

UNITED STATES PATENT OFFICE.

ESLIE R. PHILLIPS, OF NEW CHURCH, VIRGINIA.

FURROW OPENER FOR FERTILIZER DISTRIBUTORS.

1,413,353.           Specification of Letters Patent.      Patented Apr. 18, 1922.

Application filed August 16, 1919, Serial No. 317,931. Renewed March 1, 1922. Serial No. 540,382.

*To all whom it may concern:*

Be it known that I, ESLIE R. PHILLIPS, a citizen of the United States, residing at New Church, in the county of Accomac and State of Virginia, have invented certain new and useful Improvements in Furrow Openers for Fertilizer Distributors, of which the following is a specification, reference being had to the accompanying drawings.

This invention relates to an improved furrow opener for use in connection with fertilizer distributors, and one of the objects of the invention is to provide a device of this kind, which is simple, efficient, and practical in construction, and may be manufactured for a relatively low cost and sold at a reasonable profit.

The invention further aims to provide an improved furrow opener, which is adapted for connection forwardly of the fertilizer distributor, in order to open the furrow for the fertilizing material.

The invention further aims to provide an opener of this kind, involving improved and novel features of construction.

One of the features of construction consists in improved means for mounting the openers on the frame.

A further feature of the invention comprises improved means for manually manipulating the furrow openers simultaneously.

Another feature of the invention consists in a frame carried on the top of the distributor, in combination with a depending auxiliary frame, consisting of side brackets, in bearings of the lower ends of which a transverse tubular rod is mounted, and on which rod a plurality of furrow openers are pivotally mounted, in combination with a connecting bar between the several openers, and means connected to the shank of one of the openers, whereby the plurality of openers may be raised and lowered simultaneously.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts as will be hereinafter set forth, shown in the drawings and claimed.

In the drawings:

Figure 1 is a vertical sectional view through a conventional form of fertilizer distributor showing the improved furrow opener applied.

Figure 2 is an enlarged detail perspective view of the main frame, and the depending auxiliary frame also showing the furrow openers applied, including the means whereby the openers may be raised and lowered simultaneously.

Referring more especially to the drawings, 1 designates the main frame of the attachment, and which is mounted upon the upper portion of the fertilizer distributor, which is of conventional construction. This main frame comprises the side bars 2, which are connected by means of the transverse bars 3, said bars being secured together as shown at 4. A suitable tongue 5 is secured at 6 to the transverse bars 3, and this tongue carries a conventional form of draft equalizer or evener 7, to which draft animals may be connected.

Secured in any suitable manner, preferably as shown at 8 to the under part of the side bars 2 are supporting pieces 9 of the auxiliary frame. This auxiliary frame depends from the main frame, and comprises the iron straps 10. These depending iron straps are bent upon themselves to form bearings 11 for the reception of a transverse tubular rod 12. Brackets 13 are provided for the purpose of securing the frame to the fertilizer distributor.

Pivotally mounted upon the transverse tubular rod 12 are angular straps 14, which are bent as shown, and arranged in pairs, and secured between the rear ends of each pair of straps 14 is a bar 15. Secured by suitable clip or U-shaped bolts to the bars 15, is a transverse bar 16, so that when one of the bars 15 is tilted upwardly or downwardly, the other bars 15 will be simultaneously raised or lowered. Secured to the rear end of the bars 15, as by means of bolts or the like 17 are the shanks 18 of the furrow openers 19. These furrow openers are preferably constructed as shown, though not necessarily, and are designed to travel in advance of the fertilizer distributor, for the purpose of opening the furrows for the reception of the fertilizer. Pivotally connected to one of the bolts 17, say for instance the central bar 15, is a link 20. Mounted in any suitable manner at any suitable location on the main frame, preferably secured thereto as at 21 is a segment rack or quadrant 22 provided with rack teeth 23. Pivoted to the segment rack or quadrant as at 24 is an angular lever 25, the shorter arm 26 of which is adjustably connected at 27 to the link 20. This adjustable connection comprises a plurality of apertures 28 formed in the link 20, so that any one of which may receive the pivot bolt 27. Obviously, by removing the bolt 27 and adjusting it in other of the apertures 28, the link 20 can be adjusted with relation to the lever. The lever 25 is provided with a conventional form of hand grip operated dog 29, to cooperate with the teeth 23 of the segment rack, so as to hold the lever in different adjusted positions, for holding the furrow openers raised or lowered accordingly as may be desired.

When the angular lever 25 is moved in the direction of the arrow $a$, the link 20 is moved vertically, and since all the bars 15 are connected by the transverse bar 16, the plurality of furrow openers will be raised simultaneously. A reverse movement of the lever 25 will lower the openers.

The invention having been set forth, what is claimed as new and useful is:

In a device as set forth, the combination with a main frame having a draft tongue, of an auxiliary frame mounted upon the main frame and extending forwardly and provided with transverse parts secured upon the draft tongue, brackets secured to and depending from the sides of the auxiliary frame, said brackets each being constructed from a single strip of metal bent upon itself to form a bearing, a rod shiftable in the bearings of the brackets, furrow openers pivotally mounted upon said rod, a connector bar having U-shaped elements engaging said openers, whereby they are connected to move together, and means mounted upon the draft tongue having adjustable connections with one of the furrow openers for tilting the same, the connector constituting means, whereby all of the furrow openers may be tilted simultaneously.

In testimony whereof I hereunto affix my signature.

ESLIE R. PHILLIPS.